(12) United States Patent
Bomhoff et al.

(10) Patent No.: US 7,619,981 B2
(45) Date of Patent: Nov. 17, 2009

(54) APPARATUS, SYSTEM, AND METHOD FOR IDENTIFYING NETWORK MIS-CABLING

(75) Inventors: Matthew David Bomhoff, Tucson, AZ (US); Brian James Cagno, Tucson, AZ (US); Gregg Steven Lucas, Tucson, AZ (US); Kenny Nian Gan Qiu, Tucson, AZ (US); Andrew Ellis Seidel, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 881 days.

(21) Appl. No.: 10/800,529

(22) Filed: Mar. 15, 2004

(65) Prior Publication Data

US 2005/0201292 A1    Sep. 15, 2005

(51) Int. Cl.
*G01R 31/08* (2006.01)
(52) U.S. Cl. ............... 370/244; 370/249; 370/255
(58) Field of Classification Search ........... 370/244, 370/249, 255
See application file for complete search history.

(56) References Cited

U.S. PATENT DOCUMENTS

| | | | |
|---|---|---|---|
| 4,190,821 A | 2/1980 | Woodward | 340/147 |
| 4,575,841 A | 3/1986 | Fagerstedt et al. | 370/14 |
| 5,084,870 A * | 1/1992 | Hutchison et al. | 370/258 |
| 5,199,025 A | 3/1993 | Miwa | 370/16.1 |
| 5,297,134 A | 3/1994 | Takahashi et al. | 370/16.1 |
| 5,442,623 A | 8/1995 | Wu | 370/16.1 |
| 5,991,891 A | 11/1999 | Hahn et al. | 714/4 |
| 6,055,228 A | 4/2000 | DeKoning et al. | 370/258 |
| 6,381,643 B1 * | 4/2002 | Bartfai et al. | 709/224 |
| 6,456,623 B1 | 9/2002 | Kobayasi et al. | 370/395.1 |
| 6,466,989 B1 | 10/2002 | Chu | 709/250 |
| 2004/0223460 A1 * | 11/2004 | Eldridge et al. | 370/242 |
| 2006/0153562 A1 * | 7/2006 | Dolbec et al. | 398/20 |

* cited by examiner

*Primary Examiner*—Jason E Mattis
(74) *Attorney, Agent, or Firm*—Kunzler & McKenzie (57) ABSTRACT

An apparatus, system, and method are disclosed for detecting and reporting network mis-cabling. One embodiment of the apparatus includes a detection module, a comparison module, and a cabling connection module. The detection module is configured to detect a new connection at a network switch. The new connection is formed by physically connecting a network cable to the network switch, at one termination, and to another network device, at another termination. The comparison module is configured to compare the new connection to a connection rule, where the connection rule defines either a legal cabling connection or an illegal cabling connection. The cabling connection module is configured to control whether or not the new connection is inserted into the data network or maintained isolated from the data network. Certain implementations of the present invention beneficially allow a new network connection to be verified prior to logical insertion so that potential mis-routing of data and other miscommunications within the data network may be avoided.

23 Claims, 8 Drawing Sheets

APPARATUS, SYSTEM, AND METHOD FOR IDENTIFYING NETWORK MIS-CABLING

BACKGROUND OF THE INVENTION

1. Field of the Invention

This invention relates to data network cabling and more particularly relates to detecting and reporting new cable connections, as well as determining if the new cable connections are legal or valid connections according to one or more network cable connection rules.

2. Description of the Related Art

Network computing is used throughout the computing industry and is pervasive in businesses, personal, education, and many other types of computing environments. Network computing allows users on the network to share data and resources, communicated efficiently and accurately with one another, and improve the performance and results of projects implemented using network computing. One critical step in establishing a viable network environment is physically setting up the network to meet the users' needs.

As a part of setting up a network system, a multitude of network nodes, including servers, workstations, laptops, storage devices, and so forth, may be distributed throughout a home, office, city, nation, and beyond. For a local area network (LAN), for example, many of the multitude of network nodes may be hardwired in one fashion or another to other nodes on the network. In fact, parallel communications channels and various network topologies may be employed to establish the network system.

Although network systems are capable of increasing productivity and potentially allowing users to accomplish significantly more than they might without a network, errors in the physical implementation of the network may decrease the benefits of using a network system. In particular, mis-cabling within a network can have unpredictable, often negative results, for example, loss of access to all devices on a network.

Mis-cabling refers to the physical cabling connections that allow one network device to communicate with another network device over the physical cable. Physical cables may be implemented using a variety of materials and corresponding terminations. For example, copper or fiber is often used for the cable. Terminations, sometimes referred to as jacks, corresponding to the cable material and type are generally used in order to connect the network cable to a network device.

As an example, if multiple storage disks within a storage area network are connected together using fiber optic cabling, particular network topologies may be used for efficient cabling and network communications. If too few or too many cables are connected between any two network devices, the devices may fail to function properly. Moreover, such mis-cabling may adversely affect the communications over the entire network. Similarly, the network may fail to function properly if the network cables are incorrectly installed, such as to an unknown or inoperable device, or to an incorrect adapter on a network device.

The related art in this field is currently not adequately designed or implemented to prevent this type of network mis-cabling and the negative effects that may follow. Generally, the related art deals with network mis-cabling in a reactive manner. Network mis-cabling is detected only after an improperly installed cable is inserted into the network and data communications are attempted using the improperly installed cable. Unfortunately, the failed data communications may have an adverse effect on the network system before the mis-cabling even detected, reported, or corrected.

From the foregoing discussion it should be apparent that a need exists for an apparatus, system, and method that overcome the disadvantages of the current related art, namely, the inability to manage network mis-cabling in other than a reactive manner. Beneficially, such an apparatus, system, and method would prevent the network from attempting to use improperly installed cables for network communications.

SUMMARY OF THE INVENTION

The present invention has been developed in response to the present state of the art, and in particular, in response to the problems and needs in the art that have not yet been fully solved by currently available network mis-cabling systems. Accordingly, the present invention has been developed to provide an apparatus, system, and method for identifying network mis-cabling that overcome many or all of the above-discussed shortcomings in the art.

The apparatus for identifying network mis-cabling is provided with a logic unit containing a plurality of modules configured to functionally execute the necessary steps of identifying mis-cabling. These modules in the described embodiments include a detection module, a comparison module, and a cabling connection module.

The detection module may be configured to detect a new connection at a network switch, where the new connection is facilitated by a first physical termination of a network cable. In a further embodiment, the cabling detection module may determine the exact cabling configuration of the remote side as well as on the local side of the connection cable. The comparison module may be configured to compare the new connection to a connection rule, where the connection rule defines either a legal cabling connection or an illegal cabling connection. The cabling connection module may be configured to either insert or isolate the new connection in accordance with the connection rule.

In certain other embodiments of the apparatus, the detection module may be configured to determine if the new connection is a switch connection or a non-switch connection. Additionally, the cabling connection module may be configured to alter an existing connection of the data network.

In a further embodiment, the apparatus also may include a report module that is configured to notify a host of the new connection at the switch. In another embodiment, the apparatus may include an isolation module that is configured to isolate the new connection from the data network if the new connection is not a legal cabling connection. Correspondingly, the apparatus may include an insertion module configured to insert the new connection into the data network if the new connection is a legal cabling connection.

In a further embodiment, the apparatus also may include a verification module that is configured to determine if the new connection conflicts with an existing connection on the data network. Another embodiment of the present invention may include a record module configured to establish and/or manage one or more connection request records, connection records, or other records used in monitoring, detection, reporting, and other features of embodiments of the present invention.

A system of the present invention is also presented for identifying network mis-cabling. In particular, the system, in one embodiment, includes an external cable connected between a first network device and a second network device. When initially connected, the external cable forms a first new connection at the first network device and a second new connection at the second network device. The system further includes an isolation module that is substantially similar to the isolation module described above.

In another embodiment, the system may include a host server having a host bus adapter (HBA), a network switch having a network adapter, an external cable connected between the HBA and the network adapter, a cabling connection apparatus configured to detect the new connections at the HBA and the network adapter, and a comparison module configured to compare at least one of the new connections to one or more cabling connection rules in order to determine if the new connection is a legal cabling connection. Further embodiments of the system may include an insertion module, a record module, or any other module as described above with reference to the several embodiments of the apparatus.

A method of the present invention is also presented for identifying network mis-cabling. The method in the disclosed embodiments substantially includes the steps necessary to carry out the functions presented above with respect to the operation of the described apparatus and system. In one embodiment, the method includes detecting a new connection at a network switch, comparing the new connection to a connection rule, and controlling whether or not the new connection is inserted into the network in accordance with the connection rule.

The method also may include determining if the new connection is a switch connection, notifying a host of the new connection, isolating the new connection from the data network in response to a determination that the new connection is not a legal cabling connection, inserting the new connection into the data network in response to a determination that the new connection is a legal cabling connection, altering an existing connection on the data network, determining if the new connection conflicts with an existing connection on the data network, and/or establishing one or more of the records described above and in the detailed description that follows.

In certain embodiments, the described present invention advantageously detects and validates new network connections prior to attempting to insert the new connections into the network system. Additionally, certain embodiments of the present invention beneficially maintain network mis-cabling isolated so that it cannot be used for network communications, thus preventing data loss or performance degradation on the network due to the mis-cabling.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
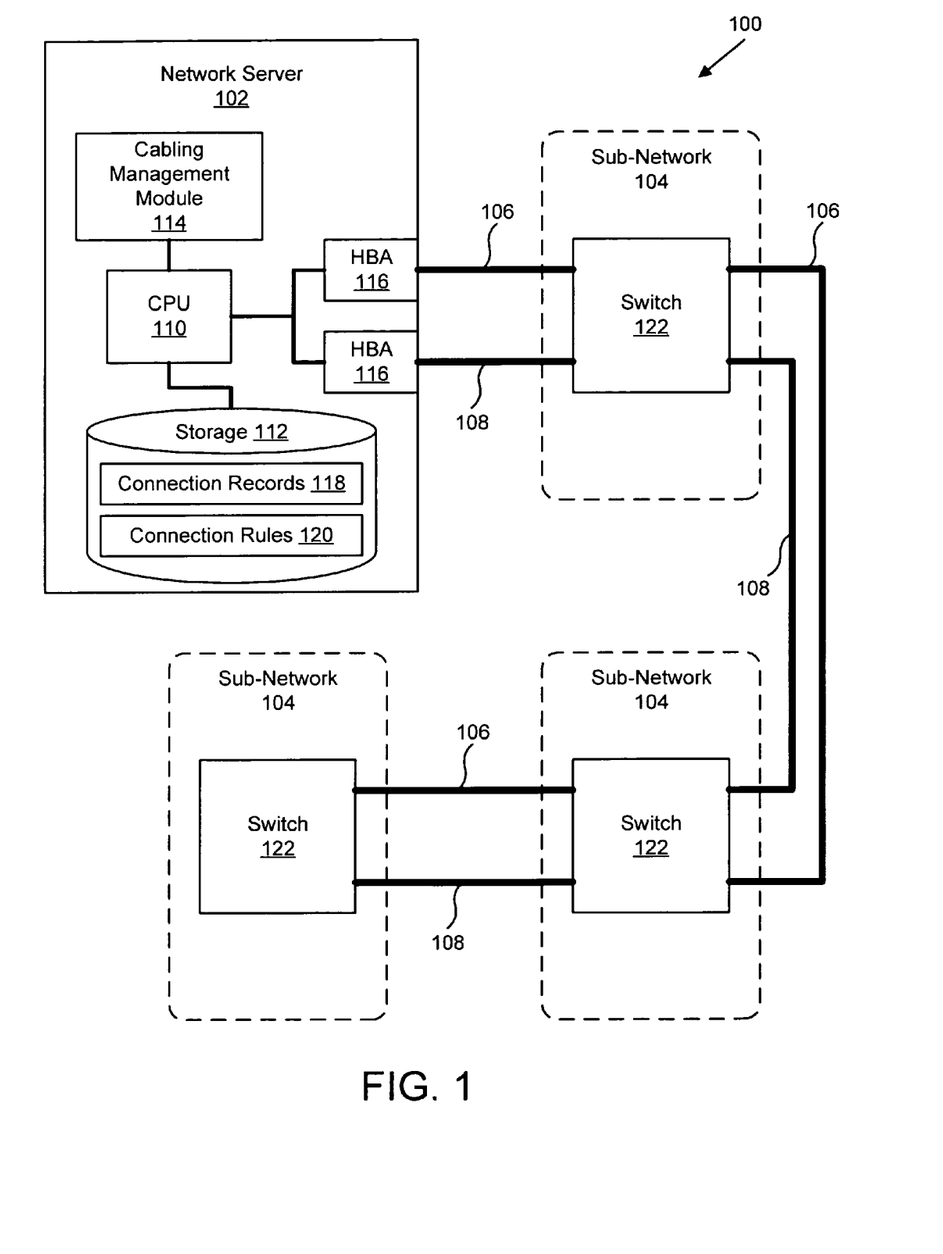
FIG. 1 is a schematic block diagram illustrating one embodiment of a data network system in accordance with the present invention.

FIG. 1 depicts one embodiment of a data network system 100 in which certain embodiments of the present invention may be employed. The illustrated data network system 100 includes a network server 102 and one or more sub-networks 104. The network server 102 and the one or more sub-networks 104 are connected, in one embodiment, via a plurality of first external cables 106 and a plurality of second external cables 108. Alternately, the network server 102 and sub-networks 104 may be connected via fewer or more external cables 106, 108. One example of a sub-network 104 is described in more detail with reference to FIG. 2.

The external cables 106, 108 also may be referred to within this description as network cables, connection cabling, and so forth. The use of the term "external" refers only to the location of the external cables 106, 108 between the network components (i.e., server 102 and sub-networks 104) as opposed to electronic cabling that may be present within the network server 102 and/or the individual sub-networks 104.

Each individual external cable 106, 108, such as the first external cable 106 between a first sub-network 104 and a second sub-network 104, may be defined to comprise a first termination and a second termination. Each termination, in one embodiment, may be located at one end of the external cable 106, 108 and include a physical adapter configured to physically connect the external cable 106, 108 to the appropriate network component. For example, the data network system 100 may comprise a Fibre Channel Arbitrated Loop (FC-AL) Switched Topology and each external cable 106, 108 may have two FC-AL adapter terminations, one at each end of the cable 106, 108.

When a cable termination is initially physically inserted or otherwise connected to a network component, the configuration may be referred to as a new connection. For example, when a first external cable 106 is initially connected between two sub-networks 104, the physical connection of a first termination to the first sub-network 104 may be identified as a first new connection and, similarly, the physical connection of a second termination to the second sub-network 104 may be identified as a second new connection.

In certain implementations, the data network system 100 may employ a loop topology comprising multiple cascaded network loops, as shown in FIG. 1. In alternate embodiments, the data network system 100 may employ any other network topology in which external cables 106, 108 are employed to connect a network server 102 and other network components.

The illustrated network server 102 includes a central processing unit (CPU) 110, an electronic storage device 112, a cabling management module 114, and one or more host bus adapters (HBAs) 116. The CPU 110 is configured, in one embodiment, to process data requests, operations, and commands that are employed to manage the data network system 100. The electronic storage device 112 is configured, in one embodiment, to electronically store data that is related to the management and operation of the data network system 100.

In a further embodiment, the electronic storage device 112 also may be configured to store one or more connection records 118 and one or more connection rules 120. A connection record 118 describes the connection configuration of an external cable 106, 108 within the data network system 100. A connection rule 120 defines a connection configuration that is considered to be legal or valid within the data network system 100. Alternately, a connection rule 120 may define a connection configuration that is considered to be illegal or invalid within the data network system 100. In one embodiment, the connection rule 120 is defined by a network administrator or network management application and may be dependent on the particular network topology, type of external cabling 106, 108, number of sub-networks, type of other network components, and so forth, within the data network system 100.

An example of a connection rule 120 that defines a legal or valid connection is a connection rule 120 that allows a first network component to be connected to a second network component if both network components are network switches 122 within separate sub-networks 104. An example of a connection rule 120 that defines an illegal or invalid connection is a connection rule 120 that does not allow, for example, more than two external cables 106, 108 to be connected between any two network switches 122. One example of a network switch 122 is described in more detail with reference to FIG. 4. The number, type, and format of connection rules 120 for both legal and illegal connections within a data network system 100 may allow a substantial number of connection rules 120 to be defined for a variety of network configurations.

One embodiment of the cabling management module 114 is described in more detail with reference to FIG. 3. The HBAs 116 are each configured, in one embodiment, to allow an external cable 106, 108, such as a fiber optic cable, to be physically connected to the network server 102.

Figure 2:
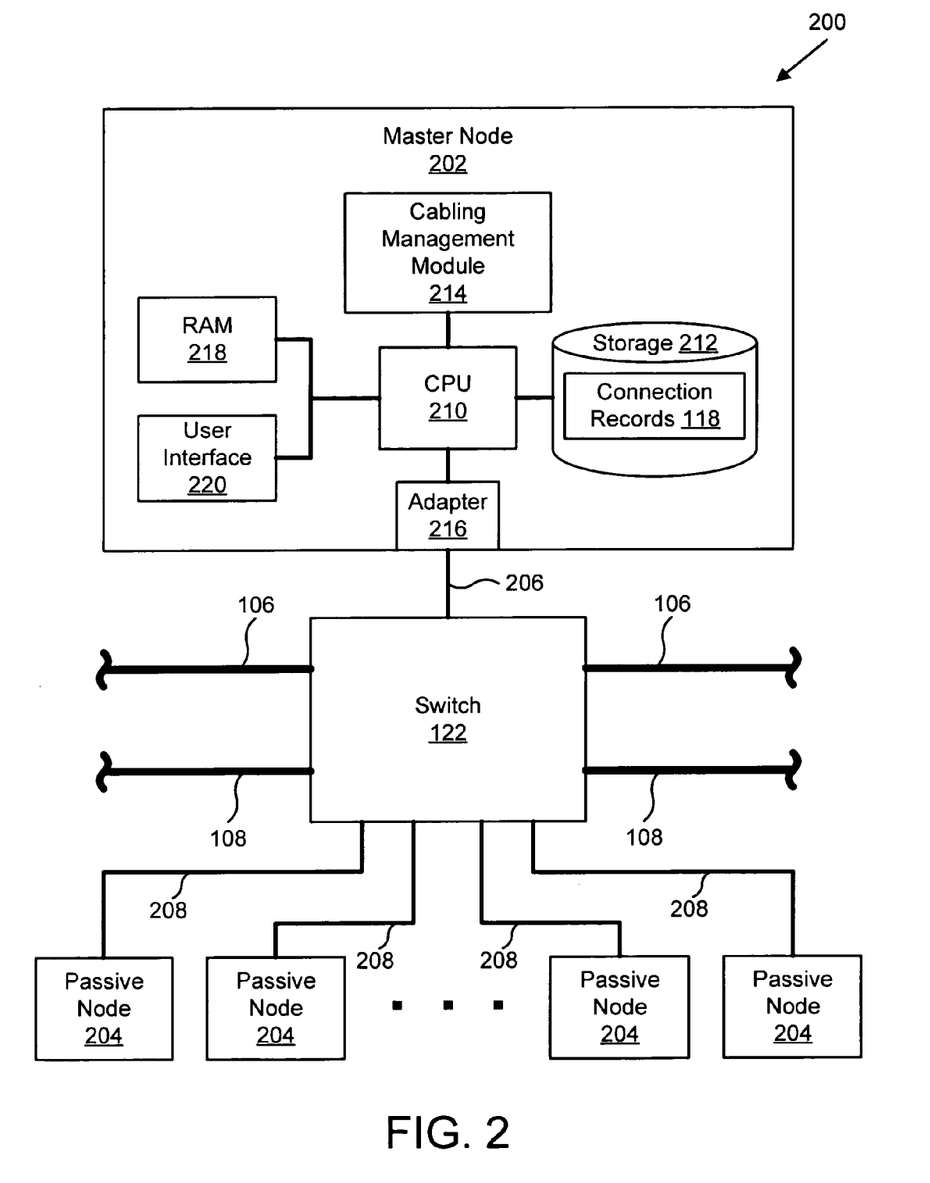
FIG. 2 is a schematic block diagram illustrating one embodiment of a data sub-network system in accordance with the present invention.

FIG. 2 depicts one embodiment of a sub-network system 200 that is given by way of example of one of the sub-networks 104 of FIG. 1. The illustrated sub-network 200 includes a switch 122, a master node 202, and one or more passive nodes 204. The master node 202 may be distinguished from the passive nodes 204, at least in part, by the role of the master node 202 in managing the operations and communications within the sub-network 200. One example of a switch 122 is described in more detail with reference to FIG. 4. The switch 122 is connected via first and second external cables 106, 108, as described above, to other network components within the data network system 100.

The illustrated master node 202 is connected to the switch 122 via a sub-network cable 206. Similarly, each passive node 204 is connected to the switch 122 via a sub-network cable 208. The depicted sub-network cables 206, 208 are not considered to be external cables 106, 108 as described with reference to FIG. 1. However, each sub-network cable 206, 208 may define a first connection at the switch 122 and a second connection at the corresponding master node 202 or passive node 204, for example. These connections may be referred to as "non-switch connections" because the second connection is connected to a non-switch component. In contrast, a "switch connection" is defined as a first connection at a first network switch 122 having a corresponding second connection at a second network switch 122.

In the depicted embodiment, the master node 202 includes a CPU 210, an electronic storage device 212, a cabling management module 214, an adapter 216, an electronic memory device 218, and a user interface 220. In one embodiment, the CPU 210 and the electronic storage device 212 are substantially similar to the CPU 110 and the electronic storage device 112 of the network server 102 shown in FIG. 1. Like the electronic storage device 112 of the network server 102, the electronic storage device 212 of the master node 202 may be configured to store one or more connection records 118. In a further embodiment, the electronic storage device 212 also may be configured to store one or more connection rules 120.

In one embodiment, the cabling management module 214 of the master node 202 may be substantially similar to the cabling management module 114 of the network server 102. One example of a cabling management module 214 is described in more detail with reference to FIG. 3. The adapter 216 is configured, in one embodiment, to allow a sub-network cable 206 to be connected to the master node 202 in order to allow data communications between the master node 202 and the network switch 122.

Figure 3:
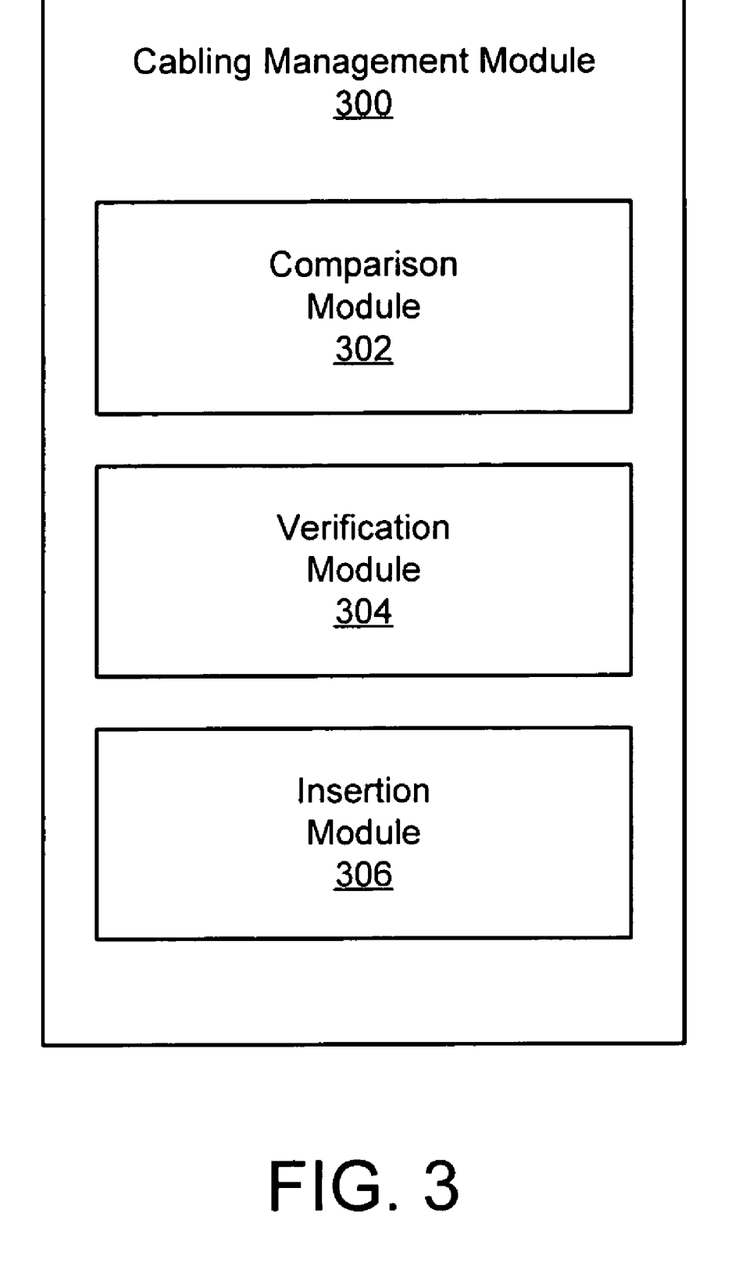
FIG. 3 is a schematic block diagram illustrating one embodiment of a cabling management module in accordance with the present invention.

FIG. 3 depicts one embodiment of a cabling management module 300 that may be substantially similar to the cabling management module 114 of the network server 102 of FIG. 1 and to the cabling management module 214 of the master node 202 of FIG. 2. The illustrated cabling management module 300 includes a comparison module 302, a verification module 304, and an insertion module 306.

The cabling management module 300, in one embodiment, may be generally configured to determine if a new connection is acceptable and, if so, to insert the new connection into the corresponding data network system 100. As shown in FIGS. 1 and 2, the cabling management module 300 may carry out this function entirely on either the network server 102 or the master node 202. In other embodiments, however, certain features of the cabling management module 300 may be implemented individually or in combination on a network server 102, a master node 202, a network switch 122, or another network or sub-network device.

The comparison module 302, in one embodiment, is configured to compare a new connection with a connection rule 120 to determine if the new connection is a legal or valid connection. For example, when a termination of an external cable 106, 108 is connected to a network switch 122, the comparison module 302 may determine if that new connection complies with all of the defined connection rules 120 applicable to a network switch 122.

The new connection may be characterized in various ways with reference to the local connection at the switch 122 and the remote connection at a second switch (not shown). Certain embodiments of the new connection are described below with reference to FIG. 7. In one embodiment, for example, the new connection is characterized a local new connection and a remote new connection (at two ends of the new connection cable). Some limited communication between the local and remote new connections may occur in order to properly characterize the new connection.

In a related way, one embodiment of the verification module 304 may be configured to determine if the new connection conflicts with an existing connection within the data network system 100 or sub-network 200. In an alternate embodiment, such verification may be defined by a connection rule 120 and implemented via the comparison module 302.

The insertion module 306 is configured, in one embodiment, to insert the new connection into the data network system 100 if the new connection is determined to be a legal or valid connection. In a further embodiment, the insertion module 306 may direct the network switch 122, for example, to not insert a new connection if the new connection is determined to be an illegal or invalid connection. In another embodiment, the insertion module 306 also may be configured to direct a network switch 122, for example, to insert the new connection in preference over an existing connection with which the new connection may conflict.

The insertion module 306 also may be referred to as a cabling connection module or may comprise a module within such cabling connection module. In certain embodiments, the switch 122 may comprise hardware capability to allow select communications over the new connection in order to communicate the necessary connection information, while maintaining the new connection otherwise isolated from the rest of the data network system 100.

Figure 4:
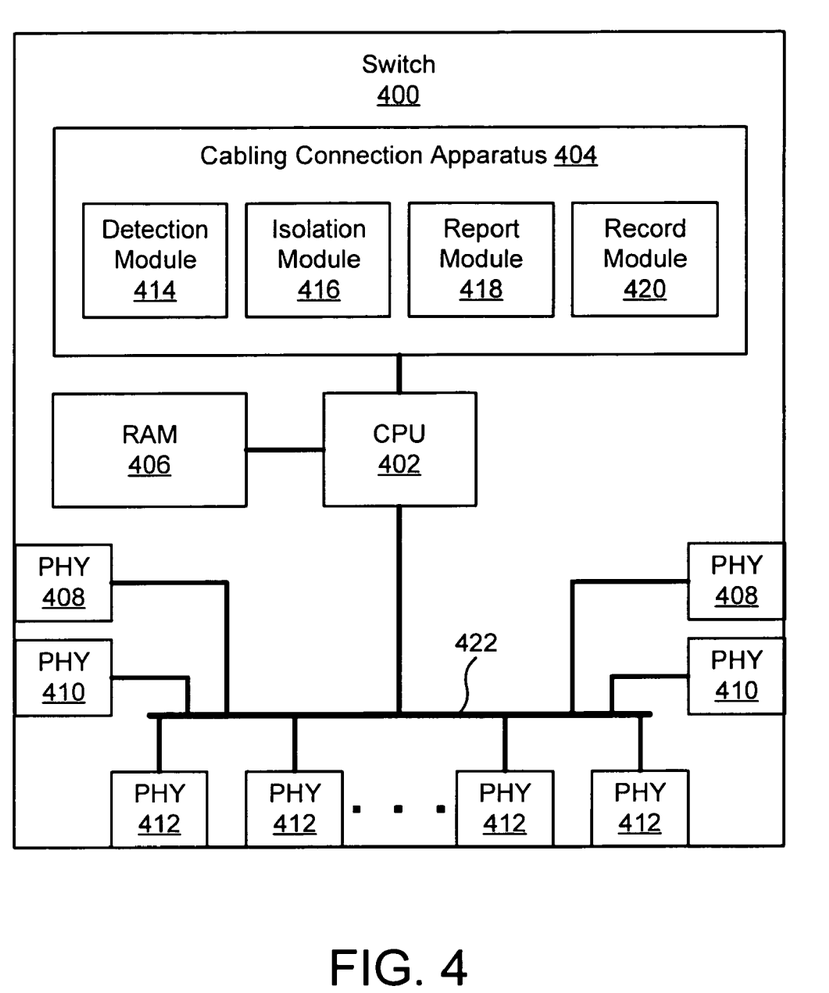
FIG. 4 is a schematic block diagram illustrating one embodiment of a network switch in accordance with the present invention.

FIG. 4 depicts one embodiment of a network switch 400 that may be substantially similar to the network switches 122 shown in FIGS. 1 and 2. The illustrated network switch 400 includes a CPU 402, a cabling connection apparatus 404, an electronic memory device 406, one or more network adapters (PHYs) 408, 410, and one or more sub-network adapters (PHYs) 412.

In one embodiment, the CPU 402 and the electronic memory device 406 may be substantially similar to the CPU 210 and the electronic memory device 218 of the master node 202 described with reference to FIG. 2. The network adapters 408, 410 are each configured to allow an external network cable 106, 108 to be physically connected to the network switch 400. In the depicted embodiment, the network switch 400 includes a first pair of network adapters 408 and a second pair of network adapters 410. In other embodiments, the network switch 400 may include fewer or more network adapters 408, 410 and pairs of network adapters 408, 410.

In a similar manner, the sub-network adapters 412 are each configured to allow a master node 202 or a passive node 204 to be physically connected to the network switch 400. In one embodiment, each of the network adapters 408, 410 and sub-network adapters 412 is connected to a data bus 422 that is in turn connected to the CPU 402.

The illustrated cabling connection apparatus 404 includes a detection module 414, an isolation module 416, a report module 418, and a record module 420. The detection module 414, in one embodiment, is configured to detect a new connection at the network switch 400. In a further embodiment, the detection module 414 may be configured to determine if the detected new connection is a switch connection (the remote termination of the newly connected cable 106, 108, 206, 208 is connected to another network switch 400) or a non-switch connection (the remote termination is connected to a HBA 116, a master node 202, or a passive node 204).

In one embodiment, the isolation module 416 is configured to isolate the new connection from the data network system 100 so that general network data cannot be transmitted via the new connection. In certain embodiments, the isolation module 416 by default may isolate all physical adapters 408, 410, 412 from the data network system 100, except for any physical adapters 408, 410, 412 that have been authorized for insertion by the insertion module 306. In a further embodiment, the isolation module 416 also may maintain a physical adapter 408, 410, 412 isolated from the data network system 100 if a new connection is determined to be illegal or invalid according to the connection rules 120.

The report module 418, in one embodiment, is configured to report a new connection to a cabling management module 300 at, for example, the network server 102 or the master node 202 within the corresponding sub-network 104. In one embodiment, the report module 418 sends a request, including a description of the new connection, to the cabling management module 300.

The record module 420 is configured, in one embodiment, to create a record that describes the new connection. In another embodiment, the record module 420 may create a record that the report module 418 may include in the request sent to the cabling management module 300. In a further embodiment, the record module 420 may create a record to describe an acceptable new connection or otherwise existing connection within the data network system 100. The record module 420, in one embodiment, may store one or more of these records in the electronic memory device 406 or in a local electronic storage device (not shown). In this way, the record module 420 may establish a history of records that have been or are used to manage the cable connections within a sub-network 104 or the data network system 102.

Figure 5:
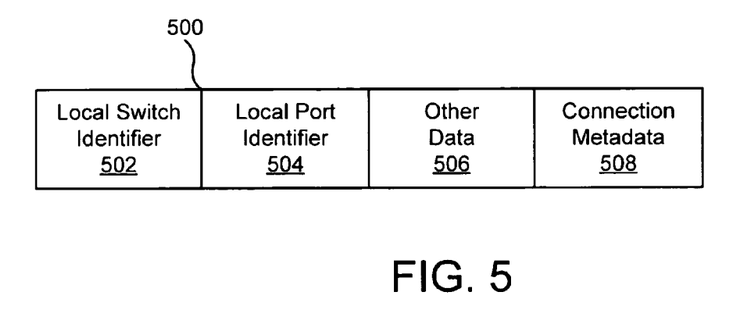
FIG. 5 is a schematic block diagram illustrating one embodiment of a connection identifier in accordance with the present invention.

FIG. 5 depicts one embodiment of a connection identification record 500 that may be configured to identify a new connection. The illustrated connection identification record 500 includes several data and metadata fields that may be used as described below. Although a specific number of data and metadata fields are shown in FIG. 5, other embodiments of the present invention may employ distinct, yet similar, formats for the connection identification records 500 that are within the scope of the present invention.

The local switch identifier field 502 is configured to store a switch identifier that identifies the network switch 400 at which the new connection is made. In one embodiment, the local switch identifier may comprise a serial number or physical address corresponding to the network switch 400. In a similar manner, the local port identifier field 504 is configured to store a port identifier that identifies the port at which the new connection is made on the network switch 400. In one embodiment, the local port identifier corresponds to a specific adapter 408, 410, 412 and may comprise a physical address or other identifier.

The illustrated connection identification record 500 also includes an other data field 506 and a connection metadata field 508. These fields 506, 508 may store other identifiers or metadata that describe the new connection, the port, the network switch 400, the anticipated connection type, or any other of various identifiers and/or metadata.

Figure 6:
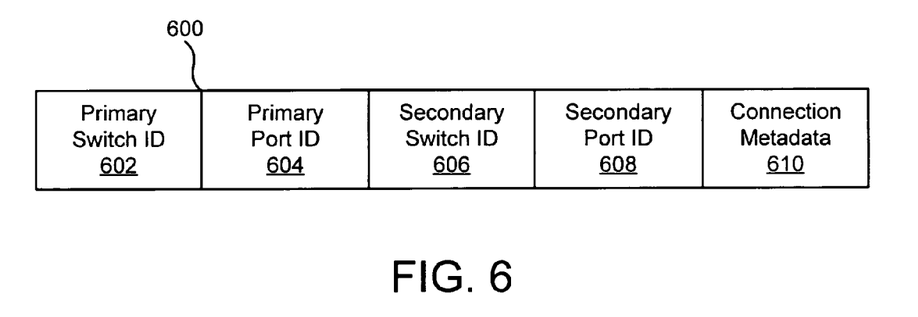
FIG. 6 is a schematic block diagram illustrating one embodiment of a connection request record in accordance with the present invention.

FIG. 6 depicts one embodiment of a connection request record 600 that may be used by a comparison module 302 to determine if a new connection is a legal or valid connection. The illustrated connection request record 600 includes several data and metadata fields that may be used as described below. Although a specific number of data and metadata fields are shown in FIG. 6, other embodiments of the present invention may employ distinct, yet similar, formats for the connection request records 600 that are within the scope of the present invention.

The primary switch identifier field 602 and the primary port identifier field 604 are substantially similar to the local switch identifier field 502 and the local port identifier field 504 of the connection identification record 500. Similarly, the secondary switch identifier field 606 and the secondary port identifier field 608 also are substantially similar to the local switch identifier field 502 and the local port identifier field 504 of the connection identification record 500.

The illustrated connection request record 600 corresponds to a switch connection, where the local connection is at a local network switch 400 and the remote connection is at another, remote network switch 400. In one embodiment, the primary identifier fields 602, 604 correspond to the local connection while the secondary identifier fields 606, 608 correspond to the remote connection. However, in an alternate embodiment, the primary fields 602, 604 may correspond to the remote connection and the secondary fields 606, 608 may correspond to the local connection.

The connection metadata field 610 is substantially similar to the connection metadata field 508 of the connection identification record as described in relation to FIG. 5. Although not depicted, certain embodiments of a connection request record 600 for non-switch connection may be analogous to the illustrated connection request record 600, except that the secondary switch identification field 606 and the secondary port identification field 608 may be replaced by one or more fields to identify the connected non-switch device or node. The depicted connection request record 600 also may be representative of a connection record 118 as mentioned with reference to FIGS. 1 and 2.

The following schematic flow chart diagrams that follow are generally set forth as logical flow chart diagrams. As such, the depicted order and labeled steps are indicative of one embodiment of the presented process. Other steps and processes may be conceived that are equivalent in function, logic, or effect to one or more steps, or portions thereof, of the illustrated process. Additionally, the format and symbology employed are provided to explain the logical steps of the process and are understood not to limit the scope of the process. Although various arrow types and line types may be employed in the flow chart diagrams, they are understood not to limit the scope of the corresponding process. Indeed, some arrows or other connectors may be used to indicate only the logical flow of the process. For instance, an arrow may indicate a waiting or monitoring period of unspecified duration between enumerated steps of the depicted process. Additionally, the order in which a particular process occurs may or may not strictly adhere to the order of the corresponding steps shown.

Figure 7:
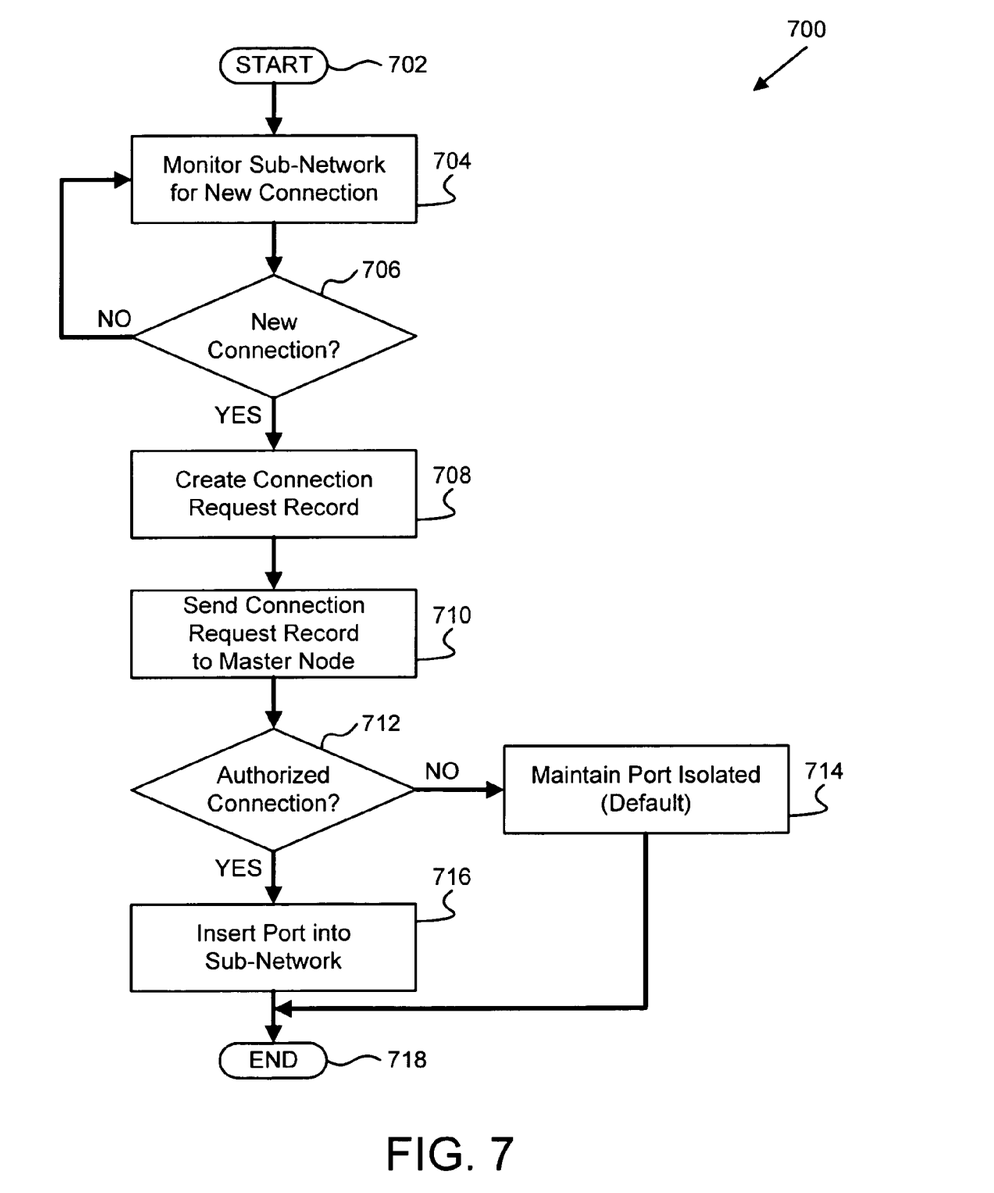
FIG. 7 is a schematic flow chart diagram illustrating one embodiment of a mis-cabling identification method in accordance with the present invention.

FIG. 7 depicts one embodiment of a mis-cabling identification method 700 that may be executed within the data network system 100 of FIG. 1. The illustrated mis-cabling identification method 700 begins 702 as the detection module 414 monitors 704 a sub-network 104 for a new connection. While a new connection is not detected 706, the detection module 414 continues to monitor 704 the sub-network. During this time, only existing connections are and may remain currently inserted into the data network system 100. All other ports and adapters 408, 410, 412 of a network switch 122 are isolated from the data network system 100.

When the detection module 414 detects 706 a new connection on the sub-network 104, the record module 420 creates 708 a connection request record 600 that identifies the local network switch 400 and the other connected network devices. One example of a connection request record 600 is described with reference to FIG. 6. Creating 708 the connection request record 600 is described in additional detail with reference to FIG. 8.

The report module 418 then sends 710 the connection request record 600 to the cabling management module 300, which may be located at the master node 202, for example. During this time, the isolation module 416 continues to isolate the new connection from the data network system 100. The processing performed by the cabling management module 300 during this time is described in further detail with reference to FIG. 9.

If the cabling management module 300 determines 712 that the new connection is an illegal or invalid cabling connection, the isolation module 416 maintains 714 the new connection isolated from the data network system 100. The cabling connection module 404 additionally may send a notification to a system administrator regarding the isolated connection. Otherwise, if the cabling management module 300 determines 712 that the new connection is a legal or valid connection, the isolation module 416 may allow the new connection to be inserted 716 into the data network system 100. After maintaining 714 the new connection isolated or inserting 716 the new connection into the data network system 100, the depicted mis-cabling identification method 700 then ends 718.

Figure 8:
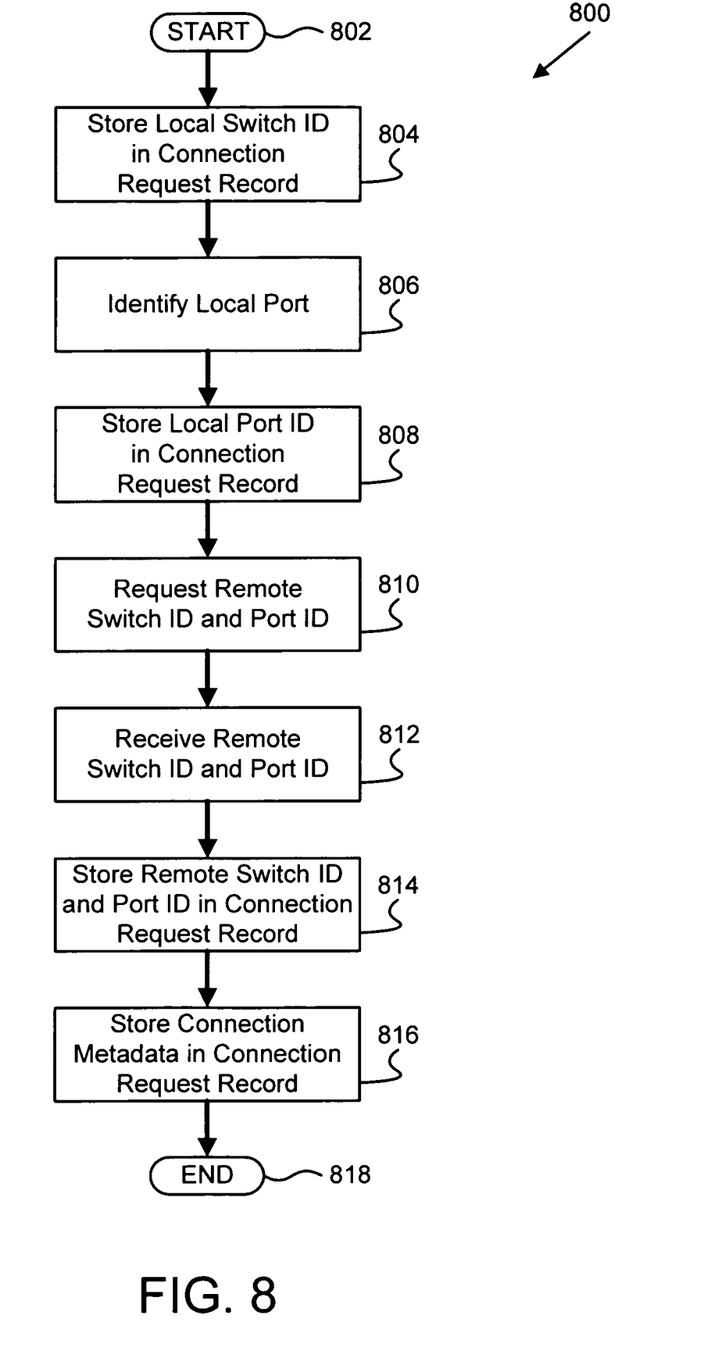
FIG. 8 is a schematic flow chart diagram illustrating one embodiment of a record creation method in accordance with the present invention.

FIG. 8 depicts one embodiment of a record creation method 800 that is given by way of example of the record creation feature 708 of the mis-cabling identification method 700 shown in FIG. 7. The illustrated record creation method 800 begins 802 as the record module 420 stores 804 the local switch identifier in the connection request record 600. The detection module 414 then identifies 806 the local port corresponding to the new connection and stores 808 the local port identifier in the connection request record 600.

In one embodiment, the detection module 414 subsequently requests 810 the remote switch identifier and the remote port identifier from the remote network switch 400 (or corresponding identifier(s) for a non-switch device). Upon receiving 812 the remote switch identifier and the remote port identifier, the record module 420 stores 814 the remote switch identifier and the remote port identifier in the connection request record 600. The record module 420 also stores any other data and/or metadata in the connection request record 600 as may be applicable within the context of the present invention. The depicted record creation method 800 then ends 818.

Figure 9:
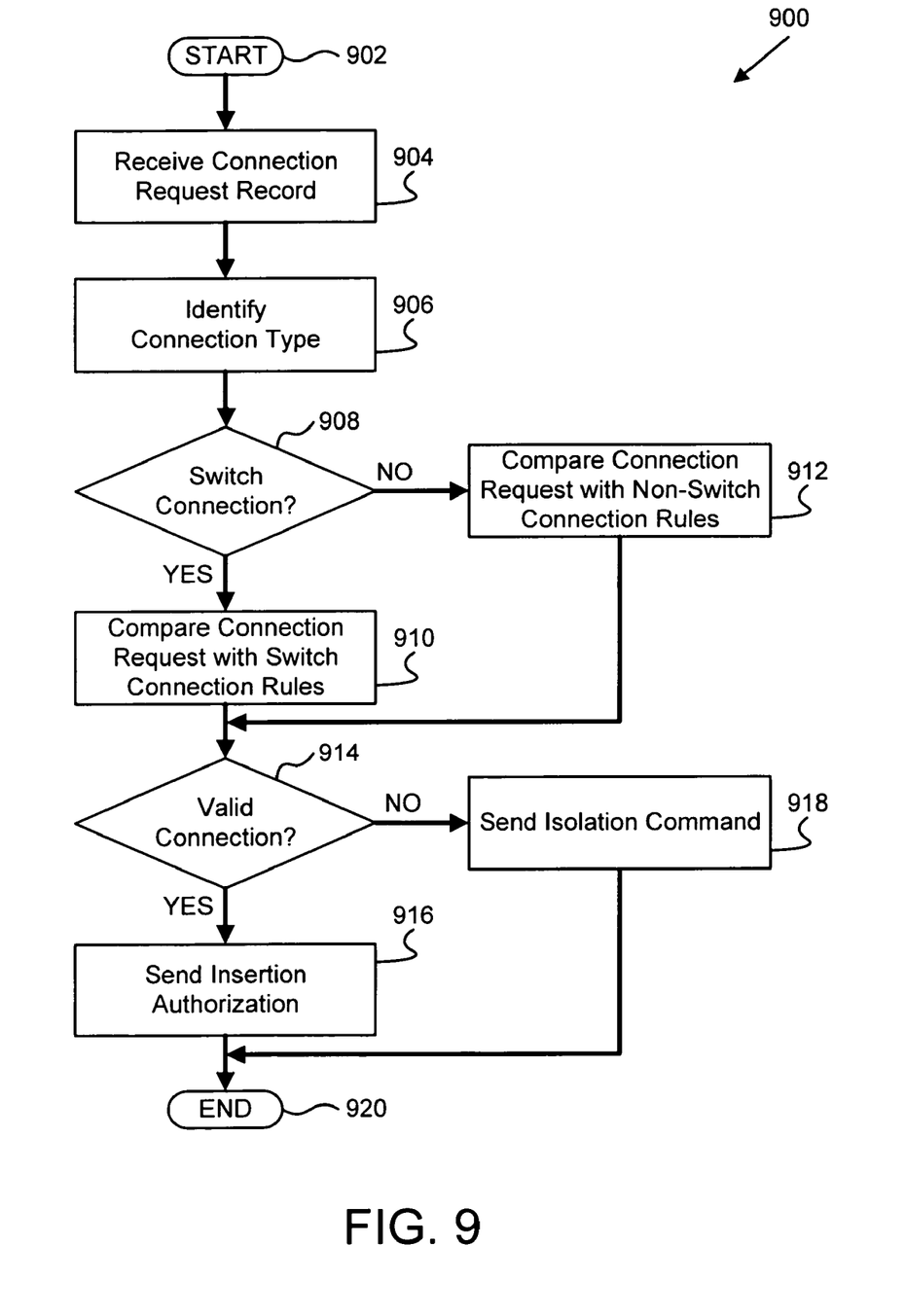
FIG. 9 is a schematic flow chart diagram illustrating one embodiment of a request processing method in accordance with the present invention.

FIG. 9 depicts one embodiment of a request processing method 900 that is given by way of example of connection request processing that may occur at the cabling management module 300 during the connection determination feature 708 of the mis-cabling identification method 700 shown in FIG. 7. The illustrated request processing method 900 begins 902 when the cabling management module 300 receives 904 a connection request record 600 from a network switch 400 or cabling connection apparatus 404.

The cabling management module 300 then identifies 906 the connection type (i.e., switch or non-switch) associated with the new connection. If the cabling management module 300 determines 908 that the connection request record 600 is associated with a switch connection, the comparison module 302 compares the new connection to the defined switch connection rules 120. Otherwise, the comparison module 302 compares the new connection to the defined non-switch connection rules 120.

Whether the connection is a switch connection or a non-switch connection, if the comparison module 302 determines 914 that the new connection is a legal or valid connection then the insertion module 306 sends 916 an insertion authorization to the requesting network switch 122 or cabling connection apparatus 404. Otherwise, if the comparison module 302 determines 914 that the new connection is an illegal or invalid connection then the insertion module 306 sends 918 an isolation command to the requesting network switch 122 or cabling connection apparatus 404 and the isolation module 416 continues to isolate the new connection from the data network system 100. After sending 916 an insertion authorization or sending 918 an isolation command, the depicted request processing method 900 then ends 920.

In certain embodiments, the described present invention advantageously detects and validates new network connections prior to attempting to insert the new connections into the network system. Additionally, certain embodiments of the present invention beneficially maintain network mis-cabling isolated so that it cannot be used for network communications, thus preventing data loss or performance degradation on the network due to the mis-cabling.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for identifying network mis-cabling, the apparatus comprising:
    a detection module configured to detect a new connection at a first network switch, the first network switch forming part of a data network comprising a plurality of network switches, wherein each network switch is connected to at least one non-switch network device;
    a record module configured to establish a connection request record stored in a network server in communication with the data network, the connection request record configured to identify the new connection at the first network switch, the new connection facilitated by a first physical termination of a cable, and a corresponding second new connection at a second network device, the second new connection facilitated by a second physical termination of the cable;
    a comparison module configured to compare the new connection to a switch connection rule if the new connection is a network switch connection, else compare the new connection to a non-switch connection rule, each connection rule defining a network topology and a type of cabling, the switch connection rule allowing communication to a second network switch in a separate sub-network over two loop topology external cables and the non-switch connection rule allowing communication over a point-to-point topology sub-network cable; and
    a cabling connection module configured to control authorization of a network communication over the new connection in accordance with the connection rules.

2. The apparatus of claim 1, wherein the detection module is further configured to determine if the new connection is a switch connection.

3. The apparatus of claim 1, further comprising a report module configured to notify a host of the new connection at the network switch.

4. The apparatus of claim 1, wherein the cabling connection module comprises an isolation module configured to isolate the new connection from the data network in response to a determination that the new connection is not a legal cabling connection.

5. The apparatus of claim 1, wherein the cabling connection module comprises an insertion module configured to insert the new connection into the data network in response to a determination that the new connection is a legal cabling connection.

6. The apparatus of claim 1, wherein the cabling connection module is further configured to alter an existing connection on the data network.

7. The apparatus of claim 1, further comprising a verification module configured to determine if the new connection conflicts with an existing connection separate from the new connection on the data network.

8. The apparatus of claim 1, wherein the record module is configured to obtain a second network device identifier, the second network device identifier descriptive of the second new connection.

9. The apparatus of claim 1, wherein the second network device is a second network switch and the connection request record comprises a first switch identifier and a first port identifier corresponding to the first new connection and a second switch identifier and a second port identifier corresponding to the second new connection, and connection metadata.

10. The apparatus of claim 1, wherein the second network device is a non-switch network device and the connection request record comprises a first switch identifier and a first port identifier corresponding to the first new connection and a non-switch network device identifier corresponding to the second new connection.

11. The apparatus of claim 1, wherein the connection request record comprises a device type identifier, a physical location identifier, and an anticipated bandwidth identifier.

12. The apparatus of claim 1, wherein the record module is further configured to establish a connection record, the connection record descriptive of the new connection and stored in a connection record database on a host.

13. A system for identifying network mis-cabling, the system comprising:
a host server having a host bus adapter;
a first network switch having a network adapter, the first network switch forming part of a data network comprising a plurality of network switches, wherein each network switch is connected to at least one non-switch network device;
an external cable having a first termination and a second termination, the first termination connected to the network adapter forming a first new connection and the second termination connected to the host bus adapter forming a second new termination;
a cabling connection apparatus configured to detect the first new connection to the first network switch and further configured to report the first new connection;
a record module configured to establish a connection request record stored in a network server in communication with the data network, the connection request record configured to identify the first new connection and a second new connection, wherein the connection request record comprises a device type identifier, a physical location identifier, and an anticipated bandwidth identifier;
a comparison module configured to compare the first new connection to a switch connection rule if the first new connection is a network switch connection, else compare the first new connection to a non-switch connection rule in order to determine if the first new connection is a legal cabling connection, each connection rule defining a network topology and a type of cabling, the switch connection rule allowing communication to a second network switch in a separate sub-network over two loop topology external cables and the non-switch connection rule allowing communication over a point-to-point topology sub-network cable; and the cabling connection apparatus further configured to control authorization of a network communication over the new connection in accordance with the connection rules.

14. The system of claim 13, further comprising an isolation module configured to isolate the first new connection, prohibiting a network communication via the first new connection, in response to a determination that the first new connection is not a legal cabling connection.

15. The system of claim 13, wherein the record module is further configured to transmit the connection request record to the comparison module.

16. A computer readable storage medium comprising computer readable code configured to carry out a method for identifying network mis-cabling, the method comprising:
detecting a new connection at a first network switch the first network switch forming part of a data network comprising a plurality of network switches, wherein each network switch is connected to at least one non-switch network device;
determining if the new connection is a network switch connection;
establishing a connection request record, the connection request record configured to identify the new connection at the first network switch and a corresponding second new connection at a second network device, the new connection facilitated by a first physical termination of a cable and the second new connection facilitated by a second physical termination of the cable, wherein the connection request record comprises a device type identifier, a physical location identifier, and an anticipated bandwidth identifier corresponding to the new connection;
obtaining a second network device identifier, the second network device identifier descriptive of the second new connection;
comparing the new connection to a switch connection rule if the new connection is a network switch connection, else comparing the new connection to a non-switch connection rule, each connection rule defining a network topology and a type of cabling, the switch connection rule allowing communication to a second network switch in a separate sub-network over two loop topology external cables and the non-switch connection rule allowing communication over a point-to-point topology sub-network cable; and
controlling authorization of a network communication over the new connection in accordance with the connection rules.

17. The computer readable storage medium of claim 16, wherein the method further comprises notifying a host of the new connection at the network switch.

18. The computer readable storage medium of claim 16, wherein the method further comprises isolating the new connection from the data network in response to a determination that the new connection is not a legal cabling connection.

19. The computer readable storage medium of claim 16, wherein the method further comprises inserting the new connection into the data network in response to a determination that the new connection is a legal cabling connection.

20. The computer readable storage medium of claim 16, wherein the method further comprises altering an existing connection on the data network.

21. The computer readable storage medium of claim 16, wherein the method further comprises determining if the new connection conflicts with an existing connection on the data network separate from the new connection.

22. The computer readable storage medium of claim 16, wherein the method further comprises establishing a connection record, the connection record descriptive of the new connection and stored in a connection record database on a host.

23. A method for identifying network mis-cabling, the method comprising:
- detecting a new connection at a first network switch, the first network switch forming part of a data network comprising a plurality of network switches, wherein each network switch is connected to at least one non-switch network device;
- determining if the new connection is a network switch connection;
- establishing a connection request record, the connection request record configured to identify the new connection at the first network switch, wherein the connection request record comprises a device type identifier, a physical location identifier, and an anticipated bandwidth identifier corresponding to the new connection, and a corresponding second new connection at a second network device, the new connection facilitated by a first physical termination of a cable and the second new connection facilitated by a second physical termination of the cable;
- comparing the new connection to a switch connection rule if the new connection is a network switch connection, else comparing the new connection to a non-switch connection rule, each connection rule defining a network topology, and a type of cabling, the switch connection rule allowing communication to a second network switch in a separate sub-network over two loop topology external cables and the non-switch connection rule allowing communication over a point-to-point topology sub-network cable; and
- controlling authorization of a network communication over the new connection in accordance with the connection rules.

* * * * *

UNITED STATES PATENT AND TRADEMARK OFFICE
CERTIFICATE OF CORRECTION

| | |
|---|---|
| PATENT NO. | : 7,619,981 B2 |
| APPLICATION NO. | : 10/800529 |
| DATED | : November 17, 2009 |
| INVENTOR(S) | : Bomhoff et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

Signed and Sealed this

Twenty-sixth Day of October, 2010

David J. Kappos
*Director of the United States Patent and Trademark Office*